US008887145B2

(12) United States Patent
Muramatsu (10) Patent No.: US 8,887,145 B2
(45) Date of Patent: Nov. 11, 2014

(54) STORAGE DEVICE AND CONFIGURATION-INFORMATION STORING METHOD

(75) Inventor: Minoru Muramatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 13/064,816

(22) Filed: Apr. 18, 2011

(65) Prior Publication Data

US 2012/0005664 A1 Jan. 5, 2012

(30) Foreign Application Priority Data

Jul. 2, 2010 (JP) .................................. 2010-152177

(51) Int. Cl.
G06F 9/44 (2006.01)
G06F 9/445 (2006.01)
H04L 29/08 (2006.01)

(52) U.S. Cl.
CPC .................................. H04L 67/1097 (2013.01)
USPC ............................. 717/168; 717/121; 717/174

(58) Field of Classification Search
USPC ......................................................... 717/168
See application file for complete search history.

(56) References Cited

U.S. PATENT DOCUMENTS

| 6,738,962 | B1 * | 5/2004 | Flaherty et al. ................. 326/38 |
| 7,000,161 | B1 * | 2/2006 | Allen et al. .................... 714/725 |
| 7,634,691 | B2 | 12/2009 | Komatsu et al. |
| 7,992,048 | B2 | 8/2011 | Komatsu et al. |
| 8,032,490 | B2 | 10/2011 | Tanaka et al. |
| 2003/0182494 | A1 * | 9/2003 | Rodrigues et al. ............ 711/100 |
| 2004/0066529 | A1 | 4/2004 | Wu et al. |
| 2005/0102603 | A1 * | 5/2005 | Tapper et al. .................. 714/770 |
| 2005/0216664 | A1 * | 9/2005 | Taninaka et al. .............. 711/114 |
| 2007/0088737 | A1 * | 4/2007 | Kawakami et al. ........... 707/102 |
| 2007/0217815 | A1 * | 9/2007 | Sato et al. ...................... 399/111 |
| 2008/0004841 | A1 * | 1/2008 | Nakamura ..................... 702/186 |
| 2009/0248905 | A1 * | 10/2009 | Kishimoto et al. ............... 710/8 |
| 2009/0290249 | A1 * | 11/2009 | Makino et al. .................. 360/31 |
| 2011/0219271 | A1 * | 9/2011 | Kaneko et al. ................ 714/47.1 |
| 2012/0005664 | A1 * | 1/2012 | Muramatsu ................... 717/168 |
| 2012/0030323 | A1 * | 2/2012 | Matsuno ........................ 709/221 |

FOREIGN PATENT DOCUMENTS

| JP | 09-244933 | 9/1997 |
| JP | 2004-127132 | 4/2004 |
| JP | 2005-301980 | 10/2005 |
| JP | 2007-265243 | 10/2007 |
| JP | 2008-262438 | 10/2008 |
| JP | 2009-193271 | 8/2009 |

OTHER PUBLICATIONS

Japanese Office Action mailed Feb. 4, 2014 in corresponding Japanese Application No. 2010-152177.
Japanese Office Action mailed Jul. 15, 2014 in corresponding Japanese Patent Application No. 2010-152177.

* cited by examiner

Primary Examiner — Dong Wong
Assistant Examiner — Marina Lee
(74) Attorney, Agent, or Firm — Staas & Halsey LLP (57) ABSTRACT

When configuration information about a configuration of a storage is changed, a determining unit of a storage device determines whether configuration information just updated is to be stored in accordance with a main update cause of the configuration information and/or a update content of the configuration information. If the determining unit determines that the configuration information is to be stored, a configuration-information storing unit stores the configuration information just updated in a configuration-information storage unit.

8 Claims, 7 Drawing Sheets

STORAGE DEVICE AND CONFIGURATION-INFORMATION STORING METHOD

CROSS-REFERENCE TO RELATED APPLICATION

This application is based upon and claims the benefit of priority of the prior Japanese Patent Application No. 2010-152177, filed on Jul. 2, 2010, the entire contents of which are incorporated herein by reference.

FIELD

The embodiments discussed herein are directed to a storage device, a configuration-information storing method, and a configuration-information storing program.

BACKGROUND

Conventionally, a high memory capacity and high input/output performance storage device is connected to many magnetic disk drives (hereinafter, abbreviated to "disks"). Such a storage device uses a configuration-information storing technology.

Configuration information, herein, is information about the configuration of a storage device. A storage device stores therein only the latest configuration information. An administrator acquires the latest configuration information from the storage device using a graphical user interface (GUI) of a maintenance personal computer (maintenance PC).

As described above, because the above storage device stores therein only the latest configuration information, if a failure occurs in the storage device, it is impossible to acquire at-the-time-of-failure configuration information. When a failure occurs in the storage device, the administrator first conducts recovery of the storage device. After the storage device recovers, the administrator acquires after-recovery configuration information and device logs and then confirms whether the storage device has actually recovered. After that, the administrator conducts a failure analysis using an estimation of the configuration information at the time of failure, this estimated configuration information being created using the acquired after-recovery configuration information and device logs. As described above, because the storage device acquires the latest configuration information after the storage device recovers, the storage device can acquire the after-recovery configuration information but it cannot acquire the at-the-time-of-failure configuration information.

Moreover, in the above configuration-information storing technology, the storage device stores therein only the latest configuration information; therefore, when device configuration is updated, the storage device has no previous configuration information. After the configuration information is updated using a GUI, even if there is a need for the previous configuration information, it is impossible to acquire the previous configuration information.

One approach to solving the above problems is to automatically store in a system disk, whenever the configuration information is updated due to a failure or in response to a GUI action, every piece of just-updated configuration information; however, because of a lack of system disk capacity, the storage device cannot adequately store therein the configuration information. A system disk has a given area and information that is needed to remain over a period of time regardless of whether the power is ON or OFF is stored in that area.

As described above, if just-updated configuration information is stored in a system disk whenever the configuration-information is updated, because of a lack of system disk capacity, the storage device cannot store therein the configuration information adequately. Especially in the event of chattering, where the status is switched to "error" repeatedly because of a component failure, and frequent component failures, the configuration information is updated frequently and every piece of updated configuration information will be stored. This leads to a lack of system disk capacity and overwriting of the configuration information; therefore, the storage device cannot store therein the configuration information adequately.

Patent Document: Japanese Laid-open Patent Publication No. 2008-262438

SUMMARY

According to an aspect of an embodiment of the invention, a storage device includes a determining unit that determines, when configuration information about a configuration of a storage is updated, whether configuration information just updated is to be stored in accordance with at least one of a main update cause of the configuration information and an update content of the configuration information; and a configuration-information storing unit that stores, if the determining unit determines that the configuration information just updated is to be stored, the configuration information just updated in a configuration-information storage unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

[a] First Embodiment

Figure 1:
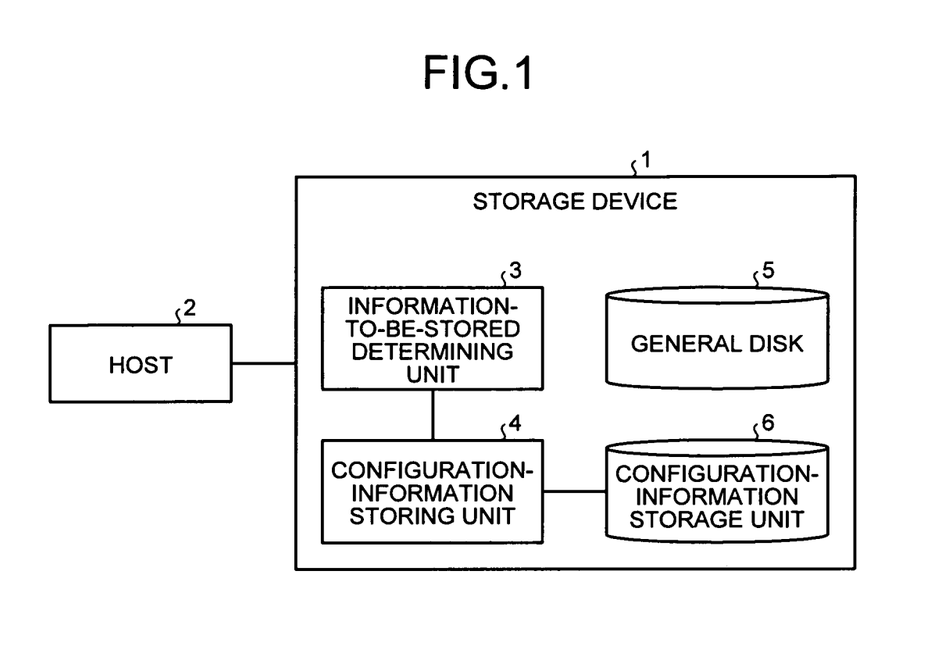
FIG. 1 is a block diagram of the configuration of a storage device according to a first embodiment.

The configuration of a storage device according to a first embodiment is described below with reference to FIG. 1. FIG. 1 is a block diagram of the configuration of a storage device according to the first embodiment. A storage device 1 includes an information-to-be-stored determining unit 3, a configuration-information storing unit 4, a general disk 5, and a configuration-information storage unit 6. The storage device 1 is connected to a host 2.

The host 2 sends reading instructions and writing instructions to the storage device to read/write from/to the general disk 5. The general disk 5 stores therein data in accordance with a writing instruction received from the host 2. The configuration-information storage unit 6 has the configuration information stored by the later-described configuration-information storing unit 4.

The information-to-be-stored determining unit 3 determines, when information about the configuration of the storage or configuration information is updated, whether the just-updated configuration information is to be stored in accordance with a main cause of the configuration-information update and/or contents of the updated configuration information. If the information-to-be-stored determining unit 3 determines that the configuration information is to be stored, the configuration-information storing unit 4 stores the just-updated configuration information in the configuration-information storage unit 6.

Because the storage device stores therein the updated configuration information only when, for example, the configuration information is updated using a GUI or the updated configuration information generally affects the storage device, only configuration information that is needed for failure analysis and device-configuration change is stored.

As described above, the storage device 1 determines whether the configuration information is to be stored in accordance with a main cause of the configuration-information update and contents of the updated configuration information and then stores only necessary configuration information in the system disk. With this configuration, the storage device can store therein the configuration information adequately efficiently using the memory capacity of the configuration-information storing unit 4.

[b] Second Embodiment

In the following section, the configuration of a storage device according to a second embodiment is described first, then the processes performed by the storage device, and finally the effects of the second embodiment are described.

Configuration of the Storage Device

Figure 2:
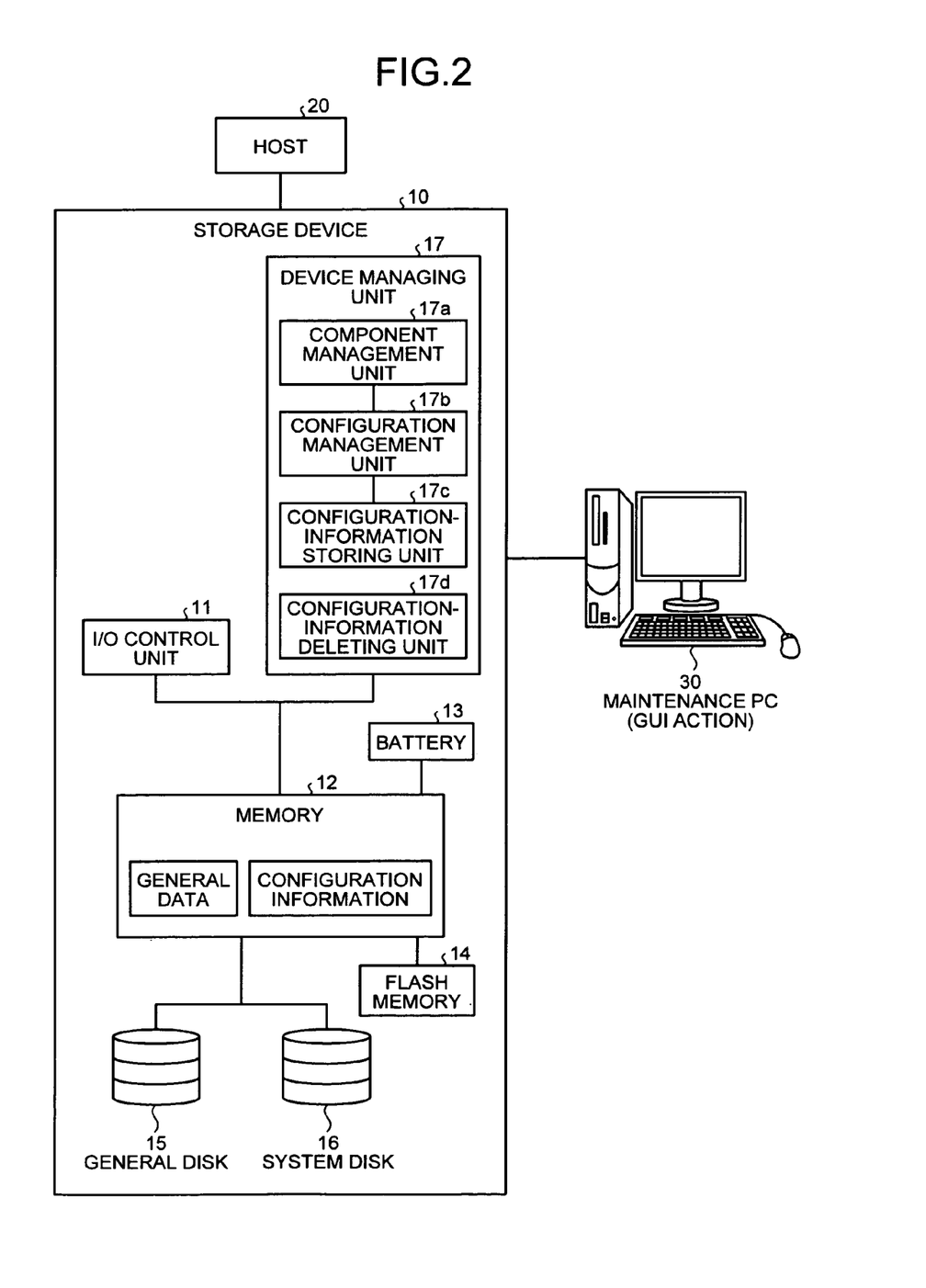
FIG. 2 is a block diagram of the configuration of a storage device according to a second embodiment.

The configuration of a storage device 10 is described below with reference to FIG. 2. FIG. 2 is a block diagram of the configuration of the storage device 10 according to the second embodiment. As illustrated in FIG. 2, the storage device 10 includes an I/O control unit 11, a memory 12, a battery 13, a flash memory 14, a general disk 15, a system disk 16, and a device managing unit 17. The storage device 10 is connected to a host 20 and a maintenance PC 30 via a network or the like. Processes performed by the above units are described below.

The I/O control unit 11 controls various information communications made with the host 20 and the maintenance PC 30 that are connected to the storage device 10. For example, the I/O control unit 11 receives reading instructions and writing instruction from the host 20 to read/write data from/to the general disk 15. The I/O control unit 11 also receives configuration-information updating instructions via a graphical user interface (GUI) of the maintenance PC 30.

The memory 12 is a volatile memory in which stored data is lost when no power is received from a main power supply or the battery 13. The memory 12 stores therein "general data" that is read/written from/to the general disk 15 in accordance with an instruction received from the host 20 and "configuration information" that is information about the configuration of the storage device 10. The configuration information will be described in details later with reference to FIG. 3.

The battery 13 is a backup power supply of the main power supply. The flash memory 14 is a nonvolatile memory in which stored data is not lost even when no power is received. If the main power supply is in trouble, data stored in a volatile memory is stored in the flash memory 14 as backup data. The general disk 15 stores therein "general data" in accordance with a writing instruction received from the host 20.

The system disk 16 has a given area and information about the configuration of the storage or configuration information and information that is needed to remain over a period of time regardless of whether the power is ON or OFF are stored in that area. More particularly, a later-described configuration-information storing unit 17*c* stores the configuration information in the system disk 16 and a later-described configuration-information deleting unit 17*d* deletes the configuration information from the system disk 16.

The system disk 16 stores therein function-based setting information, component management information, and device management information as the configuration information. Examples of the configuration information are described below. More particularly, the system disk 16 stored therein network setting values, such as setting values related to an IP address, disk-patrol setting values, firmware revision, host information, such as information about a port connected to the host 20, information about the volume of each disk, etc.

The system disk 16 further stores therein arrangement positions, serial numbers, statuses, capacities, etc., of various device components, such as memory, disks, the battery, and channel adaptors. The system disk 16 further stores therein the status of the storage device including "Ready", "Not Ready", "Subsystem Down", "Write Through", etc., and the firmware revision information (the number of reboots).

The device managing unit 17 includes a component management unit 17*a*, a configuration management unit 17*b*, the configuration-information storing unit 17*c*, and the configuration-information deleting unit 17*d*. The component management unit 17*a* monitors the components of the storage device and determines whether any error occurs. If an error occurs, the component management unit 17*a* updates the configuration information to change the status in accordance with the error.

The configuration management unit 17*b* determines, when information about the configuration of the storage device 10 or the configuration information is updated, whether the just-updated configuration information is to be stored in accordance with a main cause of the configuration-information update or contents of the updated configuration information. More particularly, when the device managing unit 17 updates the configuration information, the configuration management unit 17*b* determines whether the configuration information is updated in response to a GUI action. If it is determined that the configuration information is updated in response to a GUI action, the configuration management unit 17*b* sends an instruction to the configuration-information storing unit 17*c* to store the configuration information in the system disk 16.

Figure 3:
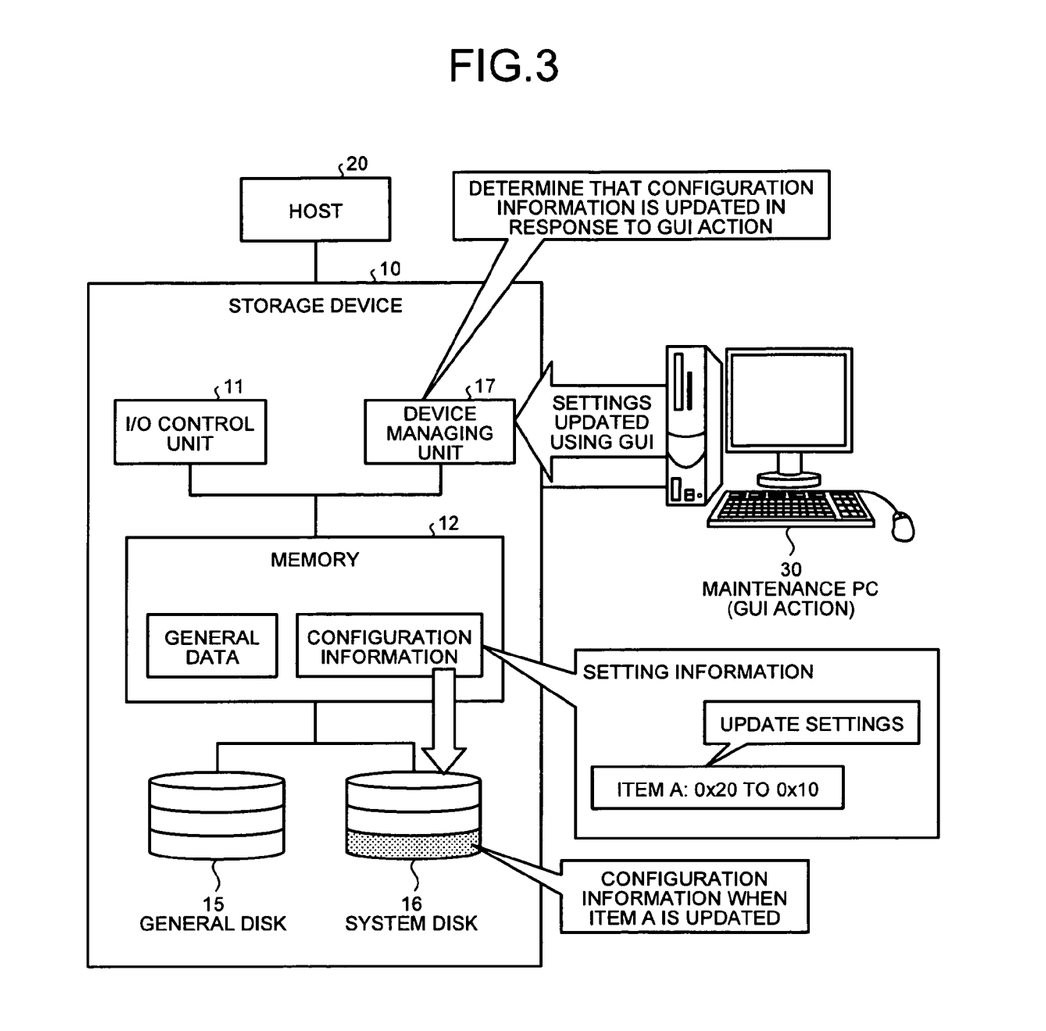
FIG. 3 is a schematic diagram that illustrates a configuration-information storing process performed when configuration information is updated using a GUI.

A configuration-information storing process is described below with reference to FIG. 3. This process is performed when the configuration information is updated using a GUI. FIG. 3 is a schematic diagram that illustrates a configuration-information storing process performed when the configuration information is updated using a GUI. In the example of FIG. 3, for example, the storage device 10 receives new settings from a GUI and updates a setting-information item A from "0x20" to "0x10". After that, the storage device 10 determines whether the configuration information is updated in response to a GUI action. If it is determined that the configuration information is updated in response to a GUI action, the just-updated configuration information or "0x10" is stored in the system disk 16.

If it is determined that the configuration information is updated due to something other than a GUI action, the configuration management unit 17b then determines whether the contents of the updated configuration information generally affect the storage device. For example, the configuration management unit 17b determines whether the updated configuration information is due to not a particular component failure but a change that generally affects the storage device, such as "Not Ready", "Write Through", etc. A list of possible updates of the configuration information that generally affect the storage device is created in advance. The configuration management unit 17b compares the actually updated configuration information with the list, thereby determining whether the contents of the updated configuration information generally affect the storage device.

If it is determined that the contents of the updated configuration information generally affect the storage device, the configuration management unit 17b sends an instruction to the configuration-information storing unit 17c to store the configuration information in the system disk 16. On the other hand, if it is determined that the contents of the updated configuration information do not generally affect the storage device, the configuration management unit 17b further determines whether the configuration information is updated from "normal" to "error".

If it is determined that the configuration information is updated from "normal" to "error", the configuration management unit 17b sends an instruction to the configuration-information storing unit 17c to store the configuration information in the system disk 16.

Figure 4:
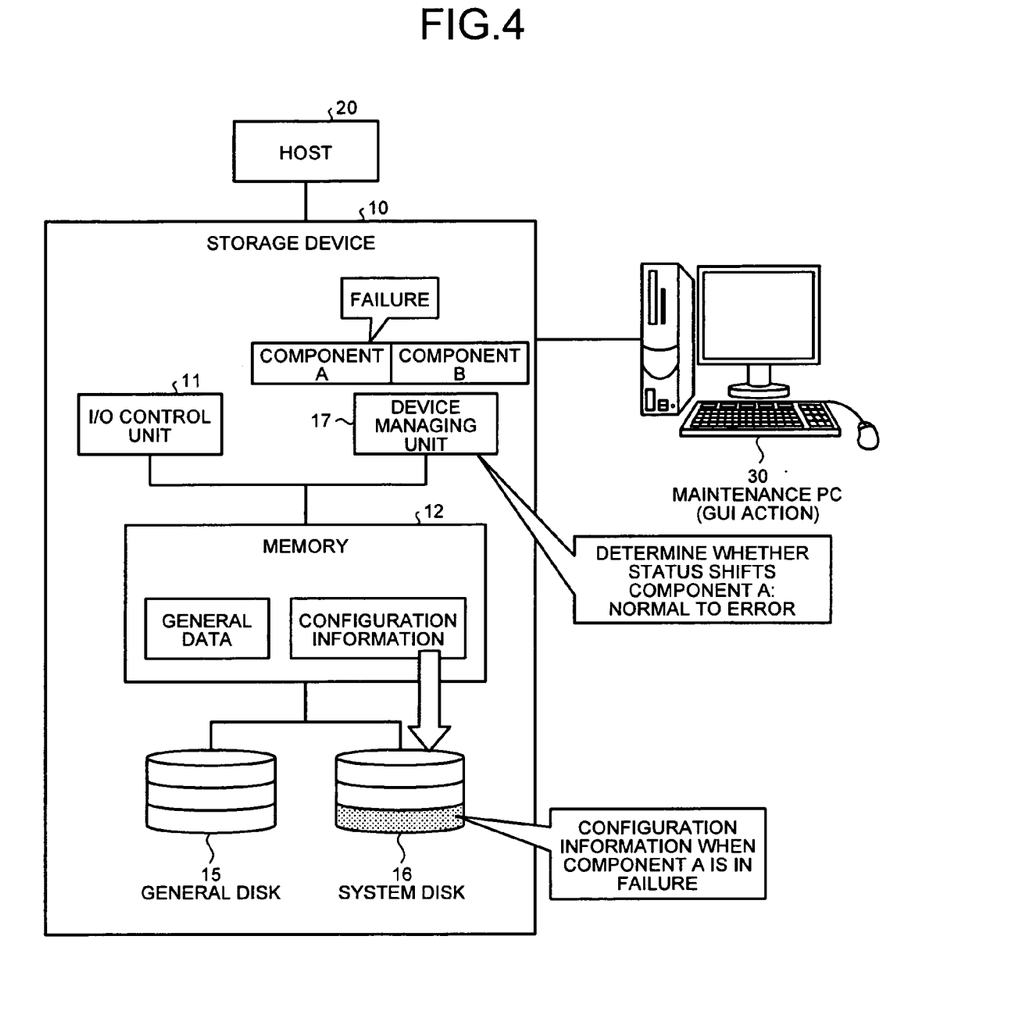
FIG. 4 is a schematic diagram that illustrates a configuration-information storing process performed when the configuration information is updated in the event of a component failure.

FIG. 4 is a schematic diagram that illustrates a configuration-information storing process performed when the configuration information is updated in the event of a component failure. In the example of FIG. 4, for example, when the storage device 10 detects that a component A is in failure, the configuration information is updated to change the status of the component A from "normal" to "error". The storage device 10 determines that the configuration information is updated from "normal" to "error" and stores the configuration information updated immediately after the component A breaks down in the system disk 16.

If it is determined that the configuration information is not updated from "normal" to "error", the configuration management unit 17b determines whether a disk is a main cause of the configuration-information update. If it is determined that a disk is a main cause of the configuration-information update, the configuration management unit 17b further determines whether the status after shift is different from the status before shift. If it is determined that the status after shift is different from the status before shift, the configuration management unit 17b sends an instruction to the configuration-information storing unit 17c to store the configuration information in the system disk 16.

Figure 5:
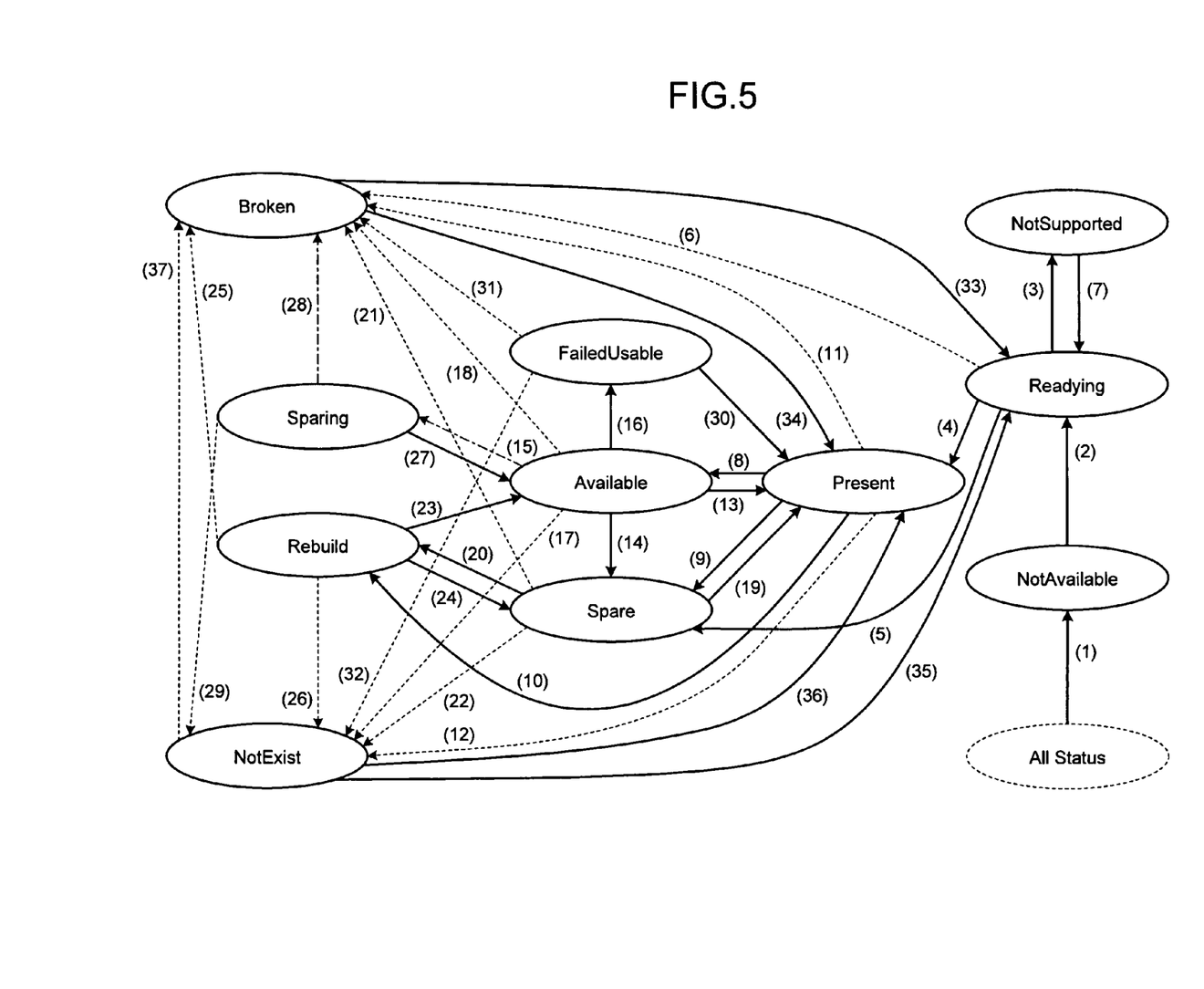
FIG. 5 is a schematic diagram that illustrates how the disk status shifts.

In other words, if a disk is a main cause, not only when the configuration information is updated from "normal" to "error" but also when the status shifts, the configuration management unit 17b determines that the configuration information is to be stored in the system disk 16. How the disk status shifts is described below with reference to FIG. 5. As illustrated in FIG. 5, for example, shift of the status to "Not Available" represents that definitions of a disk of a RAID group and definitions of a disk of a hyper storage (HS) are deleted and the disk is then unloaded from a device enclosure (DE) (see (1) of FIG. 5).

Shift of the status from "Not Available" to "Readying" represents that a disk is inserted to an empty slot and the disk is being initialized (see (2) of FIG. 5). Shift of the status from "Readying" to "Not Supported" represents that the disk is not usable until the disk is initialized forcibly because it seems that another device used to use the disk (see (3) of FIG. 5). Shift of the status from "Readying" to "Present" represents that the disk is initialized and usable or another non-HS disk is usable because of loop recovery (see (4) of FIG. 5).

Shift of the status from "Readying" to "Spare" represents that the HS is usable because of loop recovery (see (5) of FIG. 5). Shift of the status from "Readying" to "Broken" represents that the disk is in failure because a problem occurs when the disk is being initialized (see (6) of FIG. 5). Shift of the status from "Not Supported" to "Readying" represents that the disk is initialized forcibly (see (7) of FIG. 5).

Shift of the status from "Present" to "Available" represents that the disk is set to be a disk of the RAID group (see (8) of FIG. 5). Shift of the status from "Present" to "Spare" represents that the disk is set to a disk of the HS (see (9) of FIG. 5). Shift of the status from "Present" to "Rebuild" represents that it is under a Rebuild process due to disk change or it is under a copy back process due to loop recovery (see (10) of FIG. 5).

Shift of the status from "Present" to "Broken" represents that a disk failure occurs due to some reasons (see (11) of FIG. 5). Shift of the status from "Present" to "NotExist", the disk is invisible due to lock-out (see (12) of FIG. 5). Shift of the status from "Available" to "Present" represents that definitions of the RAID group are deleted (see (13) of FIG. 5).

Shift of the status from "Available" to "spare" represents that the copy back process is completed and the status shifts back to "spare" (see (14) of FIG. 5). Shift of the status from "Available" to "Sparing" represents that it is under a redundant copy because of SMART (see (15) of FIG. 5). Shift of the status from "Available" to "Failed Usable" represents that a disk failure occurs due to some reasons and a DLU breaks down or DLU is already in "Broken" (see (16) of FIG. 5).

Shift of the status from "Available" to "Broken" represents that a disk failure occurs due to some reasons (see (18) of FIG. 5). Shift of the status from "Available" to "NotExist", the disk is invisible due to loop lock-out (see (17) of FIG. 5). Shift of the status from "Spare" to "Present" represents that HS settings are released (see (19) of FIG. 5).

Shift of the status from "Spare" to "Rebuild" represents that the disk is set in the DLU as a disk to be rebuild or the disk is set in the DLU as a disk that stores therein a redundant copy (see (20) of FIG. 5). Shift of the status from "Spare" to "Broken" represents that a disk failure occurs due to some reasons (see (21) of FIG. 5). Shift of the status from "Spare" to "NotExist" represents that the disk is invisible due to loop lock-out (see (22) of FIG. 5).

Shift of the status from "Rebuild" to "Available" represents that the new disk is rebuilt (see (23) of FIG. 5). Shift of the status from "Rebuild" to "Spare" represents that the HS is failed to rebuilt due to some reasons and the HS is released, the redundant copy process is failed due to some reasons and the HS is released, or another disk is in failure during the redundant copy process being in "Exposed status" (see (24) of FIG. 5). Shift of the status from "Rebuild" to "Broken" represents that a disk failure occurs due to some reasons (see (25) of FIG. 5).

Shift of the status from "Rebuild" to "NotExist" represents that the disk is invisible due to loop lock-out (see (26) of FIG. 5). Shift of the status from "Sparing" to "Available" represents that, during the redundant copy process, a copy destination disk breaks down and a suspected disk shifts back to "Available" (see (27) of FIG. 5). Shift of the status from "Sparing" to "Broken" represents that redundant copy processing is completed and the suspected disk is then disconnected or a disk failure occurs due to some reasons (see (28) of FIG. 5).

Shift of the status from "Sparing" to "NotExist" represents that the disk is invisible due to loop lock-out (see (29) of FIG. 5). Shift of the status from "Failed Usable" to "Present" represents that definitions of the RAID group are deleted (see (30) of FIG. 5). Shift of the status from "Failed Usable" to "Broken" represents that a failed disk is repaired when the DLU is in broken or the disk shifts to "Broken" due to forced degeneracy from CGI (see (31) of FIG. 5).

Shift of the status from "Failed Usable" to "NotExist" represents that the disk is invisible due to some reasons (see (32) of FIG. 5). Shift of the status from "Broken" to "Readying" represents that disks are changed and then an initializing process starts (see (33) of FIG. 5). Shift of the status from "Broken" to "Present" represents that definitions of the RAID group are deleted (see (34) of FIG. 5).

Shift of the status from "NotExist" to "Readying" represents that the loop is recovered and then an initializing process starts (see (35) of FIG. 5). Shift of the status from "NotExist" to "Present" represents that definitions of the RAID group are deleted (see (36) of FIG. 5). Shift of the status from "NotExist" to "Broken" represents that a forced-degeneracy instruction is received from a common gateway interface (CGI) (see (37) of FIG. 5).

If it is determined that the configuration information is to be stored, the configuration-information storing unit 17c stores the just-updated configuration information in the system disk 16. More particularly, upon receiving a given instruction from the configuration management unit 17b, the configuration-information storing unit 17c stores the just-updated configuration information in the system disk.

The configuration-information deleting unit 17d determines whether each piece of configuration information stored in the system disk 16 is to be deleted and then deletes, from the system disk 16, any piece of configuration information that are determined to be deleted. More particularly, if a piece of stored configuration information is determined to be a piece of configuration information updated in response to a GUI action, the configuration-information deleting unit 17d determines whether another piece of configuration information is present in the system disk 16 that is updated more recently than the piece of the configuration information updated in response to the past GUI action. The configuration-information deleting unit 17d determines whether a piece of stored configuration information is a piece of configuration information updated in response to a GUI action using log information and information included in the configuration information.

If another piece of configuration information is present in the system disk 16 that is updated more recently than the piece of the configuration information that is being checked, the configuration-information deleting unit 17d deletes the old piece of the configuration information from the system disk. If any piece of configuration information is not present in the system disk 16 that is updated more recently than the piece of the configuration information that is being checked, the configuration-information deleting unit 17d remains the piece of the configuration information undeleted and present in the system disk and thus the process control goes to end.

If it is determined that the piece of the stored configuration information is not a piece of configuration information updated in response to a GUI action, the configuration-information deleting unit 17d further determines the piece of the configuration information is stored for a predetermined period or longer. If it is determined that the piece of the configuration information is not stored for the predetermined period or longer, the configuration-information deleting unit 17d remains the piece of the configuration information undeleted and present in the system disk.

Processes Performed by the Storage Device

Figure 6:
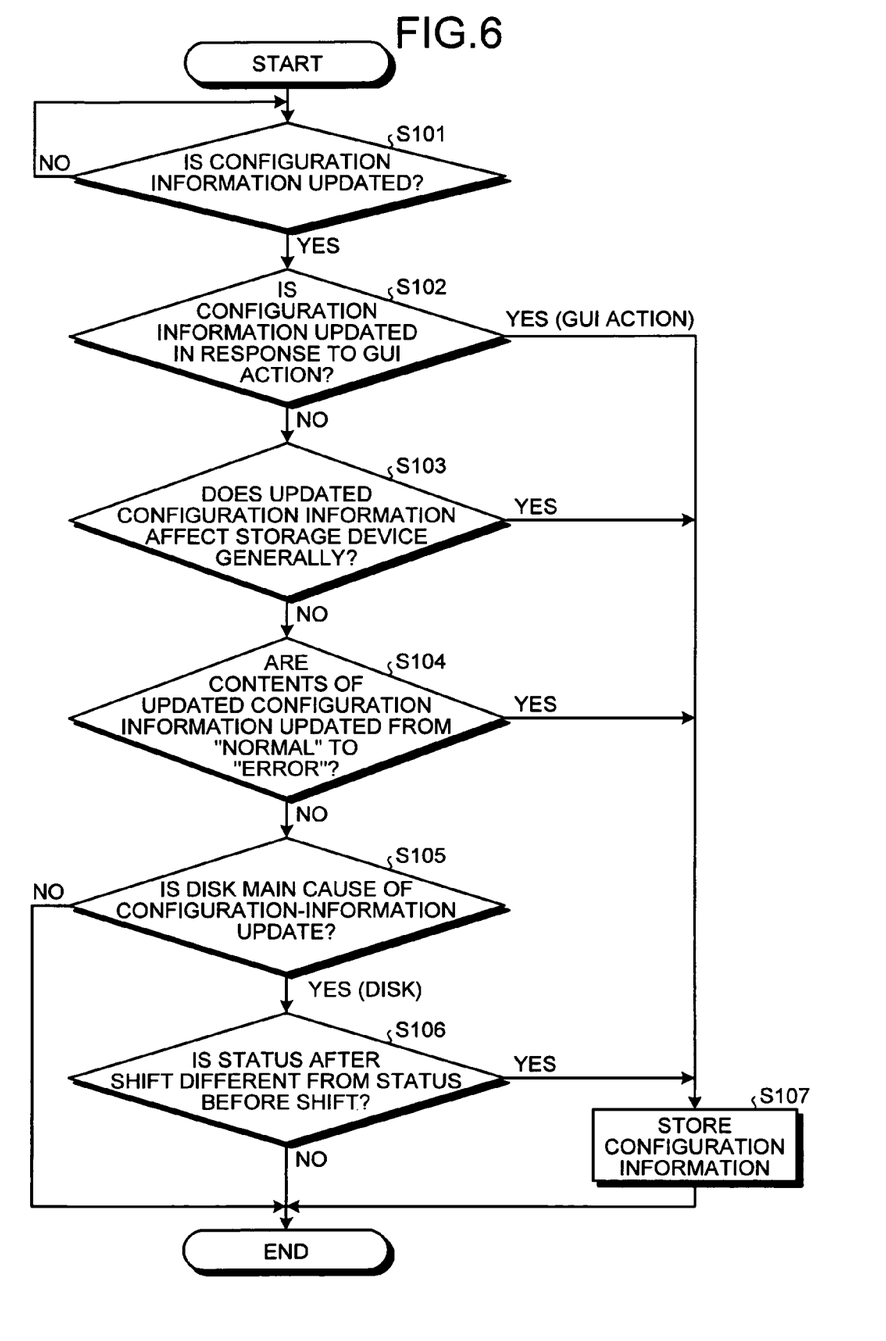
FIG. 6 is a flowchart of a configuration-information storing process performed by the storage device according to the second embodiment.
Figure 7:
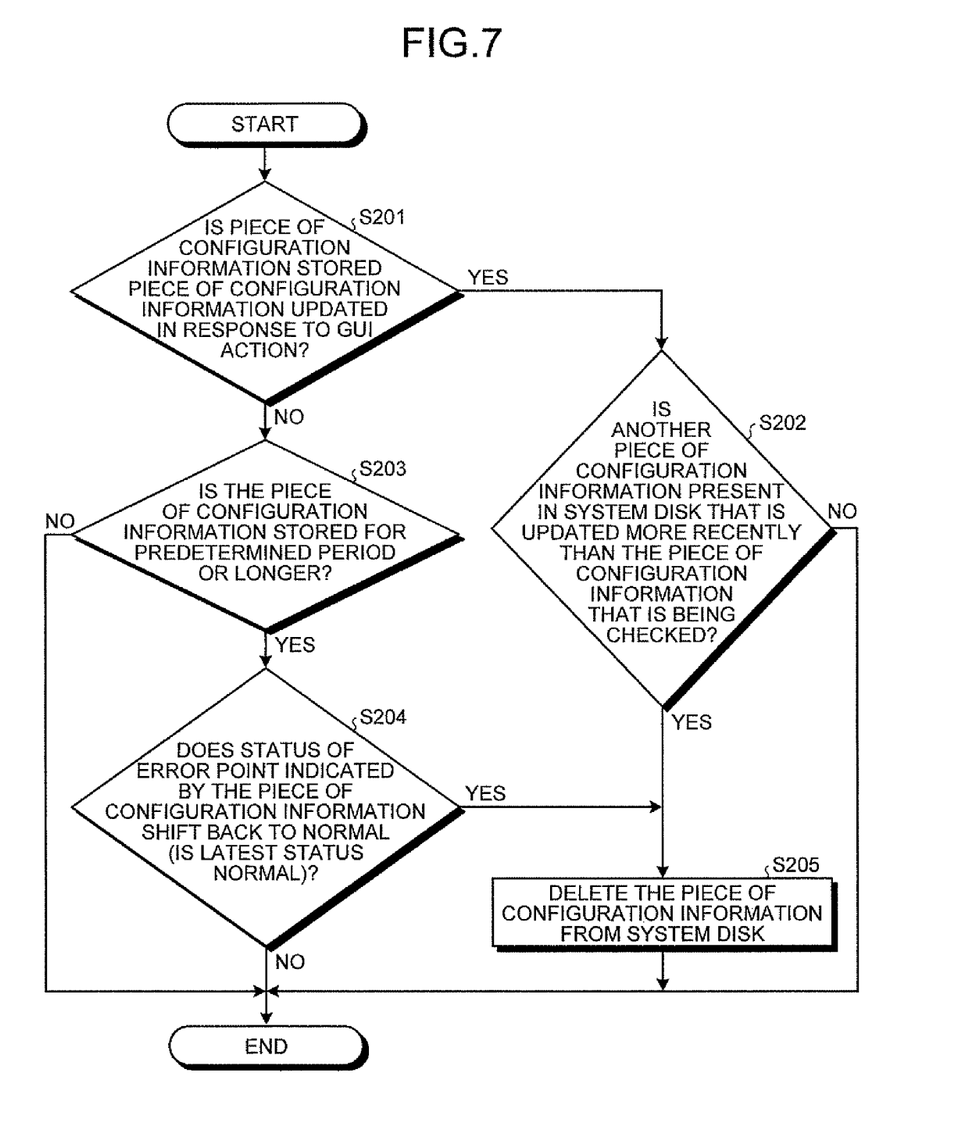
FIG. 7 is a flowchart of a configuration-information deleting process performed by the storage device according to the second embodiment.

The processes performed by the storage device 10 are described below with reference to FIGS. 6 and 7 according to the second embodiment. FIG. 6 is a flowchart of the configuration-information storing process performed by the storage device according to the second embodiment. FIG. 7 is a flowchart of the configuration-information deleting process performed by the storage device according to the second embodiment.

As illustrated in FIG. 6, when the configuration information is updated (Step S101), the storage device 10 determines whether the configuration information is updated in response to a GUI action (Step S102). If it is determined that the configuration information is updated in response to a GUI action (Yes at Step S102), the storage device 10 stores the configuration information in the system disk 16 (Step S107).

If it is determined that the configuration information is updated due to something other than a GUI action (No at Step S102), the storage device 10 further determines whether the contents of the updated configuration information generally affect the storage device (Step S103). For example, the storage device 10 determines whether the updated configuration information is due to not a particular component failure but a change that generally affects the storage device, such as "Not Ready", "Write Through", etc.

If it is determined that the contents of the updated configuration information generally affect the storage device (Yes at Step S103), the storage device 10 stores the configuration information in the system disk 16 (Step S107). If it is determined that the contents of the updated configuration information do not generally affect the storage device (No at Step S103), the storage device 10 further determines whether the configuration information is updated from "normal" to "error" (Step S104).

If it is determined that the configuration information is updated from "normal" to "error" (Yes at Step S104), the storage device 10 stores the configuration information in the system disk 16 (Step S107). If it is determined that the configuration information is not updated from "normal" to "error" (No at Step S104), the storage device 10 further determines whether a disk is a main cause of the configuration-information update (Step S105).

If it is determined that something other than disks is a main cause of the configuration-information update (No at Step S105), the storage device 10 does not store the configuration information in the system disk 16 and thus the process control goes to end. If it is determined that a disk is a main cause of the configuration-information update (Yes at Step S105), the storage device 10 further determines whether the status after shift is different from the status before shift (Step S106).

If it is determined that the status after shift is different from the status before shift (Yes at Step S106), the storage device 10 stores the configuration information in the system disk 16 (Step S107). If it is determined that the status after shift is the same as the status before shift (No at Step S106), the storage device does not store the configuration information in the system disk 16 and the process control goes to end.

The configuration-information deleting process performed by the storage device 10 is described below with reference to FIG. 7. As illustrated in FIG. 7, the storage device 10 determines whether a piece of configuration information stored in the system disk 16 is a piece of configuration information updated in response to a GUI action (Step S201). If a piece of configuration information stored is a piece of configuration information updated in response to a GUI action (Yes at Step S201), the storage device 10 further determines whether another piece of configuration information is present in the system disk 16 that is updated more recently than the piece of the configuration information that is being checked (Step S202).

If another piece of configuration information is present in the system disk 16 that is updated more recently than the piece of the configuration information that is being checked (Yes at Step S202), the storage device 10 deletes the piece of the configuration information from the system disk (Step S205). If any piece of configuration information is not present in the system disk 16 that is updated more recently than the piece of the configuration information that is being checked (No at Step S202), the storage device 10 remains the piece of the configuration information undeleted and present in the system disk and thus the process control goes to end.

If it is determined at Step S201 that the piece of the stored configuration information is not a piece of configuration information updated in response to a GUI action (No at Step S201), the storage device 10 further determines whether the piece of the configuration information is stored for a predetermined period or longer (Step S203). If it is determined that the piece of the configuration information is not stored for the predetermined period or longer (No at Step S203), the storage device 10 remains the piece of the configuration information undeleted and present in the system disk and thus the process control goes to end.

If it is determined that the piece of the configuration information is stored for the predetermined period or longer (Yes at Step S203), the storage device 10 further determines whether the status of an error point indicated by the piece of the stored configuration information shifts back to normal (Step S204). If it is determined that the status of the error point indicated by the piece of the stored configuration information shifts back to normal (Yes at Step S204), the storage device 10 deletes the piece of the configuration information from the system disk 16 (Step S205).

If it is determined that the status of the error point indicated by the piece of the stored configuration information does not shift back to normal (No at Step S204), the storage device 10 remains the piece of the configuration information undeleted and present in the system disk and thus the process control goes to end.

Effect of Second Embodiment

As described above, when the configuration information is updated, the storage device 10 determines whether the just-updated configuration information is to be stored in accordance with a main cause of the configuration-information update or contents of the updated configuration information. If it is determined that the configuration information is to be stored, the storage device 10 stores the just-updated configuration information in the system disk 16. With this configuration, the storage device can store therein the configuration information adequately.

Because the configuration information is stored adequately, at-the-time-of-failure configuration information is referable. This helps a failure analysis and decreases the time required for a failure check. Moreover, this makes it possible to easily change, even if settings are updated in response to a GUI action, the updated settings to the previous settings.

Moreover, according to the second embodiment, when the configuration information is updated, the storage device 10 analyzes the main cause of the updated configuration information and determines whether the configuration information is updated in response to an instruction received from the maintenance PC 30. If it is determined that the configuration information is updated in response to an instruction received from an external terminal, the storage device 10 stores the just-updated configuration information in the system disk 16. With this configuration, the storage device can store therein the configuration information updated in response to a GUI action and, even if settings are updated in response to a GUI action, the storage device can easily change the updated settings to the previous settings.

Furthermore, according to the second embodiment, when the configuration information is updated, the storage device 10 determines whether the contents of the updated configuration information generally affect the storage device. If it is determined that the contents of the updated configuration information generally affect the storage device, the storage device 10 stores the just-updated configuration information in the system disk 16. With this configuration, the storage device can store therein the configuration information adequately depending on whether the contents of the updated configuration information generally affect the storage device.

Moreover, according to the second embodiment, when the configuration information is updated, the storage device 10 determines whether the contents of the updated configuration information change the status of a component from normal to error. If it is determined that the contents of the updated configuration information change the status of a component from normal to error, the just-updated configuration information is stored in the system disk 16. With this configuration, the storage device can store therein the configuration information adequately depending on whether the contents of the updated configuration information change the status of a component from normal to error. As described above, if the contents of the updated configuration information generally affect the storage device, the just-updated configuration information is stored in the system disk 16, while if the contents of the updated configuration information affect the state of a component, only when the status is changed from normal to error, the configuration information is stored in the system disk 16.

Furthermore, according to the second embodiment, when the configuration information is updated, the storage device 10 determines whether the contents of the updated configuration information shift the status of a disk. If it is determined that the contents of the updated configuration information shift the status of a disk, the just-updated configuration information is stored in the system disk 16. With this configuration, the storage device can store therein the configuration information adequately depending on whether the contents of the updated configuration information shift the status of a disk.

Moreover, according to the second embodiment, when the configuration information is updated, the storage device 10 determines whether each piece of configuration information stored in the system disk 16 is to be deleted and then deletes, from the system disk 16, any piece of configuration information that is determined to be deleted. With this configuration, unnecessary pieces of configuration information are deleted adequately and thus the storage device can use the capacity of the system disk 16 efficiently.

Furthermore, according to the second embodiment, if the storage device 10 selects, from pieces of configuration information stored in the system disk 16, any piece of configuration information updated in response to an instruction received from the maintenance PC 30 and determines whether another piece of configuration information is present in the system disk 16 that is updated more recently than the piece. If it is determined that any piece of configuration information is not present in the system disk 16 that is updated in response to an instruction received from the maintenance PC more recently than the piece of the configuration information, the piece of the configuration information is deleted from the system disk 16. With this configuration, unnecessary pieces of configuration information are deleted adequately and thus the storage device can use the capacity of the system disk 16 efficiently.

Moreover, according to the second embodiment, the storage device 10 determines whether the status of an error point indicated by a piece of configuration information stored in the system disk 16 shifts back to normal. If it is determined that the status of an error point indicated by the piece of the stored configuration information shifts back to normal, the piece of the configuration information is deleted from the system disk 16. With this configuration, unnecessary pieces of configuration information are deleted adequately and thus the storage device can use the capacity of the system disk 16 efficiently.

[c] Third Embodiment

Although the present invention are embodied variously as described in the above, the present invention can be embodied in yet another way. In the following, some other embodiments of the present invention are described as a third embodiment.

(1) Storage in which Configuration Information is Stored

Although, in the second embodiment, the configuration information is stored in the system disk, the configuration information can be stored in some other storage, such as a flash memory or a storage unit of an external device.

(2) System Configuration, Etc.

The constituent elements of the device illustrated in the drawings are merely conceptual, and need not be physically configured as illustrated. The constituent elements, as a whole or in part, can be separated or integrated either functionally or physically based on various types of loads or use conditions. For example, it is allowable to integrate the component management unit 17a and the configuration management unit 17b together.

(3) Program

The configuration-information storing method described in the above embodiments can be performed when a personal computer or a work station executes a predetermined program. The program can be delivered via a network, such as the Internet. The program can be stored in a computer-readable recording medium, such as a hard disk, a flexible disk (FD), a CD-ROM, an MO, and a DVD. A computer reads the program from the recording medium and executes the read computer program.

According to an aspect of a storage device disclosed in the present application, the storage device can store therein configuration information adequately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
a storage unit that stores data;
a memory region that stores configuration information about a configuration of the storage device; and
a storage manager that determines, when an update of the configuration, information has been performed, at least one of a cause and a content in the update stores, based on at least one of the determined cause and content, the updated configuration information in a storage region different from the memory region, and deletes a piece of configuration information from the storage region, when determining, after a predetermined period has passed since the piece of configuration information was stored, that a status of an error point indicated by the piece of configuration information shifts back to normal.

2. The storage device according to claim 1, wherein
when an update of the configuration information has been performed, the storage manager determines whether the cause in the update is a response to an instruction received from an external terminal, and
if the storage manager determines that the cause in the update is a response to the instruction received from the external terminal, the storage manager stores the updated configuration information in the storage region.

3. The storage device according to claim 1, wherein
when an update of the configuration information has been performed, the storage manager determines whether the content in the update generally affects the storage device, and
if the storage manager determines that the content in the update generally affects the storage device, the storage manager stores the updated configuration information in the storage region.

4. The storage device according to claim 1, wherein
when an update of the configuration information has been performed, the storage manager determines whether the content in the update indicates a change in a status of a component from normal to error, and
if the storage manager determines that the content in the update indicates the change in the status of the component from normal to error, the storage manager stores the updated configuration information in the storage region.

5. The storage device according to claim 1, wherein
when an update of the configuration information has been performed, the storage manager determines whether the content in the update indicates that a status of a recording medium is shifted, and
if the storage manager determines that the content in the update indicates that the status of the recording medium is shifted, the storage manager stores the updated configuration information in the storage region.

6. The storage device according to claim 1, further comprising a configuration-information deleting unit that deletes from the storage region a piece of configuration information that is updated in response to an instruction received from an external terminal if, as a result of determining whether another piece of configuration information is present in the storage region that is updated more recently than the piece of configuration information, it is determined that a piece of configuration information is present in the storage region that is updated in response to the instruction received from the external terminal more recently than the piece of configuration information.

7. A configuration-information storing method performed by a storage device including a storage unit that stores data and a memory region that stores configuration information about a configuration of the storage device, the method comprising:

determining, when an update of the configuration information stored in the memory region has been performed, at least one of a cause and a content in the update; and storing, based on at least one of the determined cause and content, the updated configuration information in a storage region different from the memory region; and deleting a piece of configuration information from the storage region, when determining, after a predetermined period has passed since the piece of configuration information was stored, that a status of an error point indicated by the piece of configuration information shifts back to normal.

8. A computer-readable, non-transitory medium storing a configuration-information storing program causing a storage device, the storage device including a storage unit that stores data and a memory region that stores configuration information about a configuration of the storage device, to execute a process, the process comprising:

determining, when an update of the configuration information stored in the memory region has been performed, at least one of a cause and a content in the update;

storing, based on at least one of the determined cause and content, the updated configuration information in a storage region different from the memory region; and deleting a piece of configuration information from the storage region, when determining, after a predetermined period has passed since the piece of configuration information was stored, that a status of an error point indicated by the piece of configuration information shifts back to normal.

* * * * *

UNITED STATES PATENT AND TRADEMARK OFFICE
CERTIFICATE OF CORRECTION

PATENT NO. : 8,887,145 B2  
APPLICATION NO. : 13/064816  
DATED : November 11, 2014  
INVENTOR(S) : Minoru Muramatsu It is certified that error appears in the above-identified patent and that said Letters Patent is hereby corrected as shown below:

On the Title Page

Column 2, Item [56] (Primary Examiner), Line 1, Delete "Dong" and insert -- Don --, therefor.

In the Claims

Column 12, line 7, Claim 1, delete "configuration," and insert -- configuration --, therefor.

Column 12, line 8, Claim 1, delete "update" and insert -- update, --, therefor.

Signed and Sealed this  
Third Day of March, 2015

Michelle K. Lee  
*Deputy Director of the United States Patent and Trademark Office*